Nov. 6, 1962 J. J. CHYLE 3,062,950
ARC SPOT WELDING METHOD AND APPARATUS
Filed Dec. 1, 1960 3 Sheets-Sheet 2

*INVENTOR.*
JOHN J. CHYLE
BY
ANDRUS & STARKE
Attorneys

Nov. 6, 1962    J. J. CHYLE    3,062,950
ARC SPOT WELDING METHOD AND APPARATUS
Filed Dec. 1, 1960    3 Sheets-Sheet 3

*INVENTOR.*
JOHN  J.  CHYLE
BY
ANDRUS & STARKE
Attorneys

United States Patent Office 3,062,950
Patented Nov. 6, 1962

3,062,950
ARC SPOT WELDING METHOD AND APPARATUS
John J. Chyle, Milwaukee, Wis., assignor to A. O. Smith Corporation, Milwaukee, Wis., a corporation of New York
Filed Dec. 1960, Ser. No. 72,986
13 Claims. (Cl. 219—127)

This invention relates to an arc spot welding method and apparatus and particularly to a method and apparatus for establishing a multiple spot arc weld or welds.

In arc spot welding, a consumable electrode is fed through a welding nozzle and an arc is struck between the end of the electrode and the work. Normally, the work includes a pair of overlapping metal members and the weld is established by burning through the upper member or by depositing a weld spot including the edge of one member. A gas cup is secured to the nozzle and is adapted to rest upon the workpiece and enclose the arc with a shielding gas fed into the gas cup to shield the arc from the surrounding atmosphere. The gas cup also shields the glare of the arc from the surrounding area and avoids the necessity for a curtain or other protective fixture over the eyes of the workman.

An automatic timing unit controls the power supply connection as well as the flow of shielding gas, cooling water and the like such that the operator is only required to correctly place the nozzle over the work and actuate the time to automatically produce an arc spot weld. The manual skill and dexterity required of the operator is therefore at a minimum.

Arc spot welding presently employs single spot welds with spaced spot welds employed where a high strength joining of the metal members is required.

A single arc spot weld is not sufficiently strong for many applications because of the small interface diameter of the weld. Generally, elongated welds have only been produced by arcs which are progressively moved to form a continuous weld. Such welding processes require use of automatic moving apparatus or manual welding operators having a great amount of skill. Further, the processes also include the usual difficulty of crater elimination at the end of the weld. The finish of the final weld of the prior art processes are not satisfactory in many applications and require subsequent finishing.

The present invention is directed to producing a weld consisting of a series of spaced or overlapping, adjacent arc spot welds by either manual or automatic spot welding apparatus.

In accordance with the present invention, a series of spot welds are sequentially established with each arc being struck upon the termination of the immediately preceding and adjacent arc. A series of laterally spaced electrodes are supported in accordance with the center-to-center spacing of the individual arc spot welds. The electrodes are individually and sequentially fed to the work and individual adjacent welding arcs are sequentially established between the electrodes to form an elongated arc spot weld.

By proper spacing of the electrodes, an elongated weld of continuous connection is thereby provided having an outward continuous appearance similar to the conventional manual or automatic strip weld. A cross-section of the weld includes either three distinct interfaces or one single interface depending again primarily on the electrode spacing.

The present invention eliminates the skill of the operator or the necessity for automatic control for moving an electrode for the production of a sound, elongated weld. Each arc is readily established generally in accordance with conventional arc spot welding and presents no particular difficulty and the problem of crater elimination normally attendant upon creation of an elongated type weld is eliminated.

In accordance with another aspect of the present invention, a single power source can be employed because the arcs are individually and separately established and consequently power is being supplied to only one arc at a time. Automatic timing means preferably establish a predesigned sequence of welding arcs. Since each electrode wire can be fed through its own timer mechanism, the length of each electrode consumed can be separately adjusted to obtain the desired type of elongated weld.

In accordance with another aspect of this invention, a single nozzle is provided for spacing the electrodes and for connecting the power source in common to the electrode. A single gas cup is secured to the nozzle to enclose the arc end of all of the electrodes. The single gas cup directs the shielding gas over the complete arc area to enclose each arc as it is created and eliminates the necessity for other glare protection devices.

In edge arc spot welding with conventional gas shielded connections applied to the present invention, the angular location of the electrode is important. For a flat, horizontal edge weld, the electrodes should be placed at an angle of substantially 30 degrees to the vertical to obtain optimum welding characteristics. Further, in edge arc spot welding a relatively tight fit between the overlapping members at the arc area is much more important than in burn-through welding.

The present invention provides a simple and ready are spot welding method and apparatus for forming an elongated type of weld with complete elimination of the necessity of highly skilled operators and automatic complicated mechanisms.

The drawings furnished herewith illustrate the best mode presently contemplated for carrying out the invention.

In the drawings:

FIG. 3 is a horizontal section taken on broken line 3—3 of FIG. 1 illustrating the sequential driving arrangements for the electrodes shown in FIGS. 1 and 2;

FIG. 8 is a vertical section through a weld illustrating wide electrode spacing;

FIG. 9 is a view similar to FIG. 8 illustrating the result of reducing the electrode spacing;

FIG. 10 is a view similar to FIGS. 8 and 9 illustrating the result of further reducing the electrode spacing.

Figure 1:
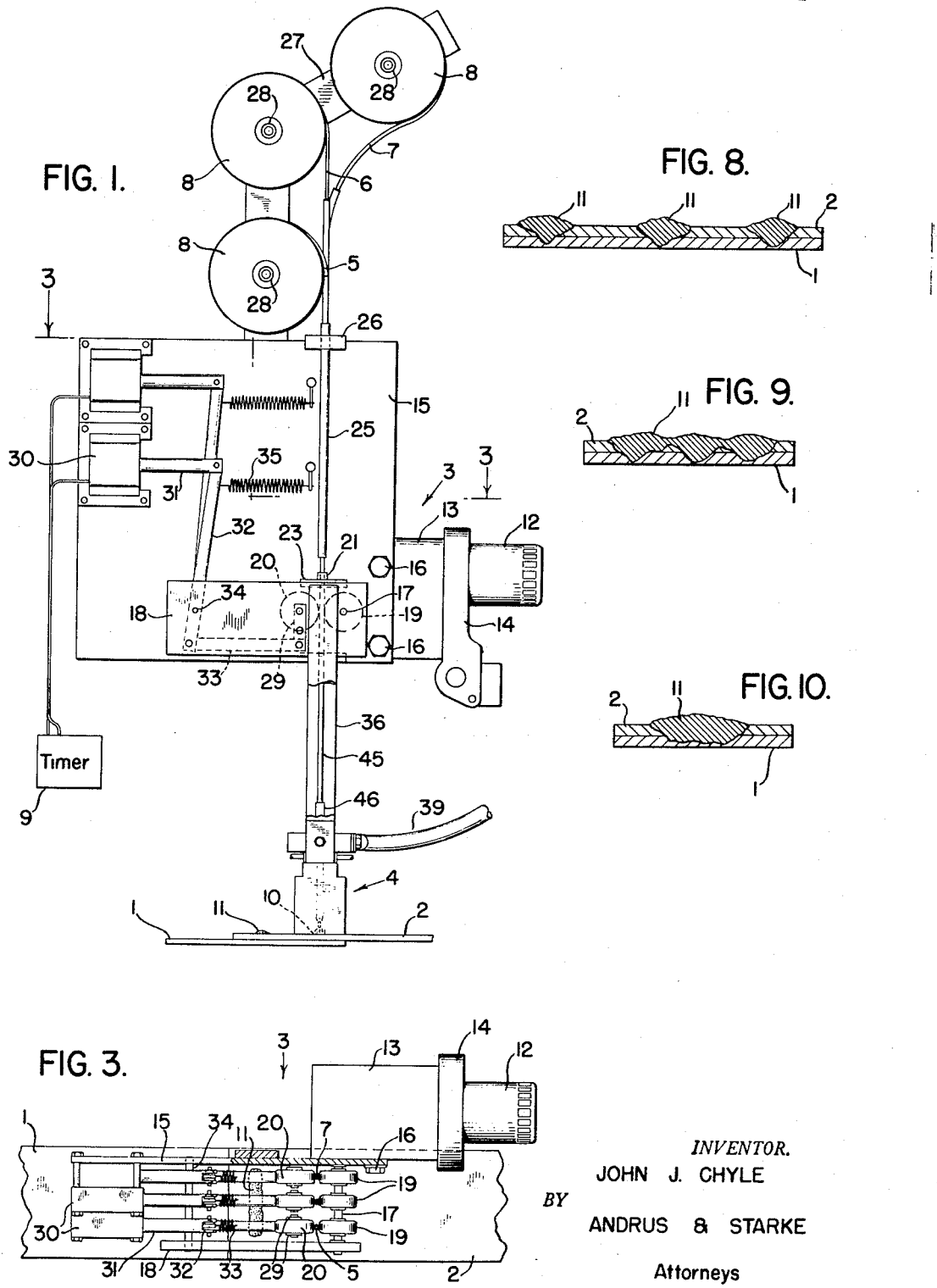
FIG. 1 is an elevational view of an arc welding apparatus constructed with a plurality of spaced electrodes in accordance with the present invention for burn-through welding of overlapping metal members.
Figure 2:
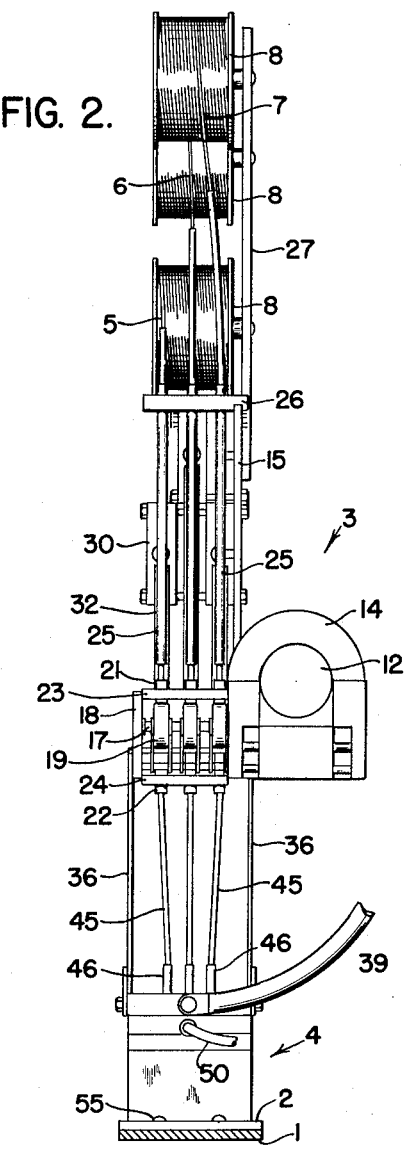
FIG. 2 is an end view of the unit shown in FIG. 1.

Referring particularly to FIGS. 1–3 of the drawings, an arc welding apparatus is shown positioned to arc spot weld a pair of overlapping plates 1 and 2 along the overlapped portions by the process of burn-through welding. A welding head 3 is movably mounted above the overlapping portions of plates 1 and 2 and includes a nozzle assembly 4 immediately adjacent the overlapped portions. Three electrodes 5, 6 and 7 are carried by individual reels 8 which are rotatably mounted on the upper end of the welding head 3. The electrodes 5, 6 and 7 are adapted to be withdrawn from reels 8 and continuously passed through the nozzle assembly 4 toward the overlapping plates 1 and 2 for a preselected period. The drive for electrodes 5, 6 and 7 is controlled by a control timer 9 to selectively and sequentially move the electrodes toward the plates 1 and 2. An arc 10 is established between each electrode and the overlapping plates 1 and 2 during the movement of the electrode. An elongated weld 11 extending laterally of the overlapping direction of the plates 1 and 2 is thereby formed automatically.

The illustrated weld head 3 generally includes a single drive motor 12 secured to a gear box 13 by a mounting and supporting C-clamp 14. A mounting plate 15 is releasably secured to the side of the gear box 13 by a plurality of bolts 16 which extend through suitable openings in plate 15 and thread into tapped openings in the casing of the gear box 13. An electrode drive shaft 17, which is driven by motor 12, projects laterally from the gear box through an opening in the plate 15. A bearing plate 18 is rigidly secured and in spaced relation to the mounting plate 15 and rotatably supports the free end of shaft 17. As most clearly shown in FIG. 3, three similar driven wheels 19 are secured in axially spaced relation upon the electrode drive shaft 17 between the mounting plate 15 and the bearing plate 18. Three back-up wheels 20 are pivotally supported in spaced alignment with driven wheels 19 and are biased into engagement with the wheels, as hereinafter described. The electrodes 5, 6 and 7 are spaced in accordance with the axial spacing of the aligned wheels 19 and 20 and extend one each between each aligned pair of wheels 19 and 20. The electrodes 5, 6 and 7 are resiliently grasped in sequence, as hereinafter described, and transported through the welding nozzle assembly 4 by energization of motor 12. The axis of wheels 19 and 20 should be accurately aligned to prevent bending of the electrodes and interfering with electrode feed for optimum results. If desired, straightening wheels, not shown, can be provided above the wheels 19 and 20 to remove the wire cast created by reels 8.

Figure 4:
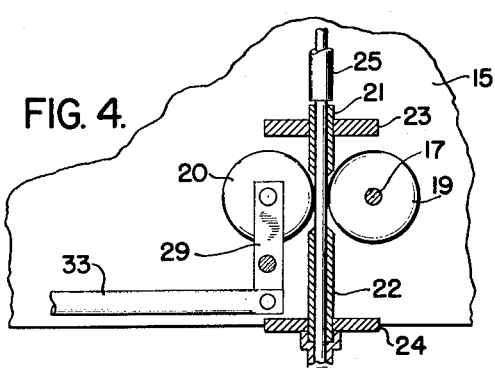
FIG. 4 is an enlarged fragmentary view showing the electrode propelling wheels of the illustrated embodiment of the invention.

Referring particularly to FIGS. 2 and 4, tubular electrode guides 21 and 22 are respectively supported by support plates 23 and 24 immediately above and below the adjacent surfaces of wheels 19 and 20. Electrode guide tubes 25 are secured to the upper end of the mounting plate by a suitable bracket 26 with each tube 25 in alignment with one of the electrode guides 21 and 22 to align the corresponding electrodes with the feed wheels 19 and 20.

Each of the electrode reels 8 is supported upon an electrode supporting arm 27 which projects upwardly from the mounting plate 15. Suitably spaced journals 28 on arm 27 rotatably carry the reels 8 for successive unwinding of the electrodes by the wheels 19 and 20.

As previously described, the driven wheels 19 are simultaneously rotated to provide a prime moving source for each of the electrodes 5, 6 and 7. Back-up wheels 20 are individually and similarly supported for separate and individual frictional engagement with the aligned electrodes to allow sequential transfer of the electrodes 5, 6 and 7.

For purposes of simplicity and clarity of explanation, the support for electrode 5 is described.

As most clearly shown in FIGS. 1, 3 and 4, wheels 20 is journaled between a pair of individual pivot plates 29 which are pivotally mounted between the plates 15 and 18 for swinging movement into and away from the associated drive wheel 19. A solenoid 30 is attached to the upper portion of the mounting plate 15 and includes a reciprocating armature 31. A depending connecting arm 32 is pivotally connected to the outer end of armature 31 and to the supports 29 by a generally horizontal arm 33. Arm 32 is pivotally mounted on a shaft 34 which is secured between plates 15 and 18. When solenoid 30 is energized, the armature 31 is retracted and the arm 32 pivots counterclockwise as viewed in FIG. 1. Arm 33 is moved toward wheels 20 and pivots the plates 29 counterclockwise. The wheel 20 moves away from the aligned wheel 19 and prevents movement of the associated electrode 5.

A coil spring 35 is connected at one end to the upper portion of the arm 32 and is anchored at the opposite end to plate 15. The spring 35 is stressed to continuously bias the back-up wheel 20 into frictional engagement with the driven wheel 19. When the solenoid is de-energized, the armature 31 is released and the spring 35 forces the back-up wheel 20 to frictionally grip the aligned electrode 5 such that upon energization of motor 12, the electrode 5 is carried to nozzle assembly 4.

The spring 35 is selected to establish a firm gripping of the electrode 5 without deforming or flattening of the electrode. Flat spots and bends in the electrode 5 tend to cause wedging of the electrode as it passes through the nozzle assembly 4 and a resulting erratic feed.

In accordance with the present invention, the timer 9 interconnects the individual solenoids 30 to a power supply for sequential energization of the solenoids 30 and a resultant movement of the electrodes 5, 6 and 7 through nozzle assembly 4, as hereinafter described in connection with the circuit diagram shown in FIG. 7.

The nozzle assembly 4 is secured in downwardly spaced relation from the wheels 19 and 20 by a pair of depending brackets 36.

Figure 5:
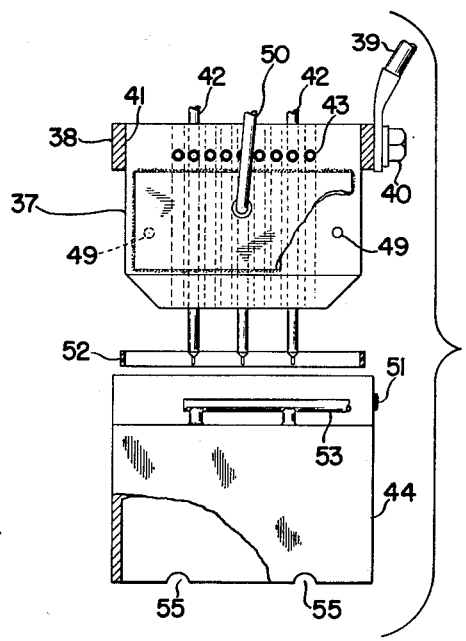
FIG. 5 is an enlarged exploded view of the nozzle assembly shown in FIG. 1 with parts broken away to show the details of construction.
Figure 6:
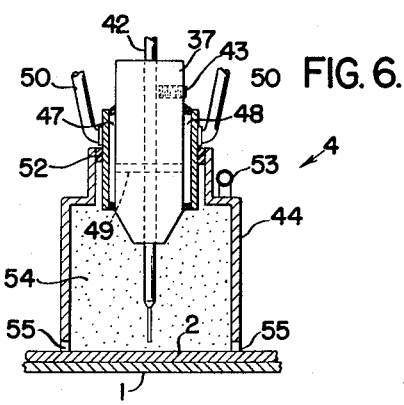
FIG. 6 is an enlarged end view of the nozzle with parts broken away.

Referring particularly to FIGS. 5 and 6, the nozzle assembly 4 generally includes a nozzle 37 clamped or wedged within a contact plate 38. A power lead 39 is bolted to the plate 38 as by bolt 40 to supply current to the nozzle 37. The contact bolt 40 may also be threaded through a tapped opening in the adjacent portion of the contact plate 38 and bear directly upon the nozzle 37 to insure firm electrical engagement between the nozzle 37 and the contact plate 38.

The nozzle 37 is a generally rectangular block-like member mounted within an aperture 41 in plate 38 with the principal axis or plane aligned with the line of the weld. Nozzle 37 includes a series of spaced openings within which contact tubes 42 are releasably secured as by set screws 43. The contact tubes 42 supply current to the electrodes and support the end of the electrodes in proper alignment with the work plates 1 and 2. A gas cup 44 is secured to the nozzle 37 encircling the contact tubes 42 to establish a complete enclosure of arc 10 during the welding operation.

Flexible conduits 45 include couplings 46 telescoped over the entrance end of contact tubes 42 and the discharge end of the lower contact guides 22. The flexible conduits 45 constitute a continuation of the guide passage between the wheels 19 and 20 and the nozzle assembly 4.

Referring particularly to FIGS. 5 and 6, the nozzle 37 has a double-wall construction on opposite sides of the principal plane defining water cooling chambers 47 and 48. Passages 49 are provided in the opposite ends of the block interconnecting the water cooling chambers 47 and 48. A pair of conduits 50 are connected to a source of water or other suitable coolant, not shown, and to chambers 47 and 48 for providing circulation of the coolant adjacent the nozzle to carry away the heat generated by the arc 10 and the current passage through the nozzle 37.

The gas cup 44 is a rectangular tubular member which rests directly on the upper plate member 2 and defines a gas passage encircling the nozzle 37. The upper end is reduced to define an opening providing a sliding fit with the adjacent portion of the nozzle 37 and a set screw 51 provides a positive securement of the cup 44 to nozzle 37. An insulating sleeve 52 is disposed between the sliding surfaces of nozzles 37 and cup 44 to prevent shorting of the nozzle 37 and contact tubes 42 to the plate 2. A gas line 53 is releasably connected to the cup 44 and supplies a shielding gas 54 into the gas passage surrounding the nozzle 37. A plurality of small recesses 55 are provided in the lower edge of the cup 44 to allow the gases to escape.

In the assembled relation, the gas cup 44 is slipped upwardly over the nozzle 37 with the upper end adjacent the water inlet and outlet conduits 50. The gas cup 44 projects downwardly beyond the lowermost end of the nozzle 37 including the contact tubes 42 and engages the upper work plate 2 to completely enclose the arc area. The gas 54 passes downwardly through the passage between cup 44 and nozzle 37, enveloping arc 10 and out through the small recesses 55 to prevent contamination of the weld metal. The gas cup 44 also encloses the intense glare of the arc during a welding operation.

Figure 7:
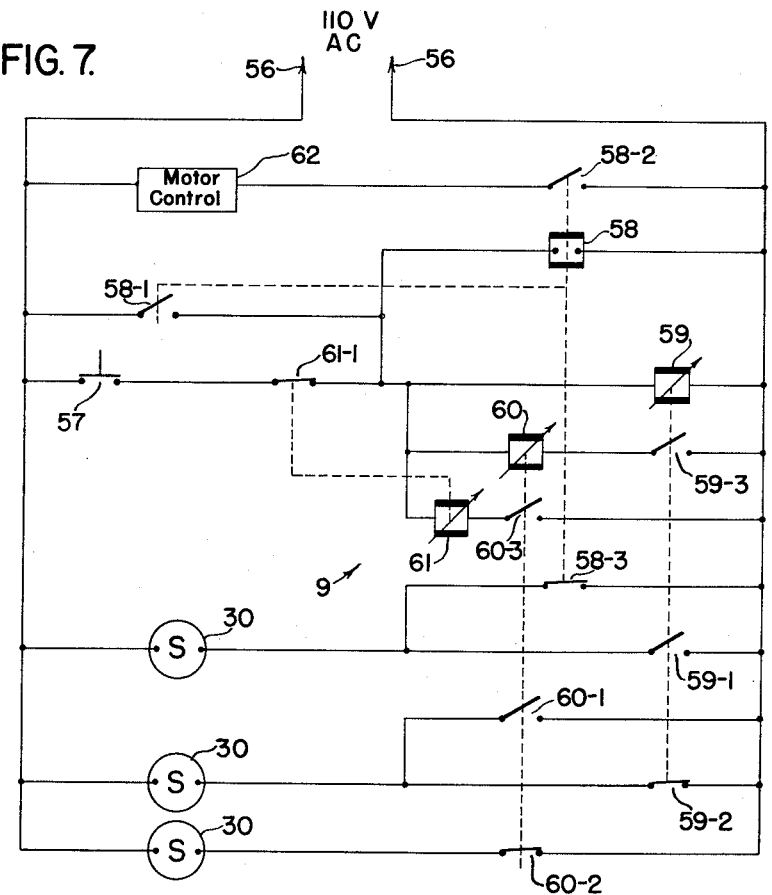
FIG. 7 is a schematic circuit diagram for operating the welding unit shown in FIG. 1.

Referring particularly to FIG. 7, a preferred circuit control including timer 9 and solenoids 30 is shown for sequentially establishing arcs 10 between the several electrodes 5, 6 and 7 and the upper plate 2.

A set of suitable control power lines 56 are provided for supplying power to the timer 9 which sequentially completes the circuit from power lines 56 to the solenoids 30 in the following manner.

A main on-off push button switch 57 is connected in separate series circuits with a control relay coil 58 and three timing coils 59, 60 and 61 for the electrodes 5, 6 and 7 respectively. Relay coil 58 is energized immediately upon closing of switch 57 and operates a pair of normally open contacts 58–1 and 58–2 and a normally closed contact 58–3. Contacts 58–1 are connected in parallel with switch 57 and form a circuit latch to maintain energization of the circuit after switch 57 is released. The contacts 58–2 are connected in series with a motor control circuit 62. Upon energization of coil 58, contacts 58–2 close and energize the control circuit 62 to operate the electrode feed motor 12.

Contacts 58–3 are connected in series with the solenoid 30 associated with the electrode 5. Contacts 58–3 are normally closed to maintain solenoid 30 energized and thereby hold back-up wheel 20 in spaced relation to electrode 5 and wheel 19. Energizing of relay coil 58 opens contacts 58–3 and de-energizes solenoid 30. The associated spring 35 forces the wheel 20 against electrode 5 and establishes a timed drive of the electrode.

Simultaneously with energizing of relay coil 58, the timing coil 59 is energized. The timing coil 59 actuates three sets of contacts 59–1, 59–2 and 59–3 after an adjustable energized period.

Contacts 59–1 are normally open contacts connected in parallel with relay contacts 58–3 and in series with solenoid 30 for electrode 5. At the end of the energized period, contacts 59–1 close and solenoid 30 is again energized to withdraw wheel 20 from electrode 5 and open the arc 10 at electrode 5.

Contacts 59–2 are normally closed contacts connected in series with solenoid 30 for controlling movement of electrode 6. At the termination of the energized time for coil 59, contacts 59–2 open and break the circuit through the solenoid 30. Electrode 6 is then driven toward plate 2 and an arc 10 is struck therebetween.

Contacts 59–3 are normally open contacts connected in series between the timing coil 60 and the switch 57 to prevent energization of coil 60 until the end of the timing period of coil 59. Timing coil 60 is therefore energized simultaneously with the stopping movement of electrode 5 and the initiating movement of electrode 6.

Timing coil 60 is similar to coil 59 and actuates three sets of contacts 60–1, 60–2 and 60–3 after an adjustable energized period.

Contacts 60–1 are normally open contacts connected in parallel with the timing contacts 59–2. When coil 60 times out, contacts 60–1 close and the associated solenoid 30 is energized to remove wheel 20 from electrode 6. The feed of electrode 6 ceases and the arc 10 between electrode 6 and plate 2 is broken.

Contacts 60–2 are normally closed contacts connected in series with the solenoid 30 for electrode 7. During movement of electrodes 5 and 6, the solenoid 30 for electrode 7 is maintained energized and prevents movement of electrode 7. When timing coil 60 times out, contacts 60–2 open and solenoid 30 for electrode 7 is de-energized. The associated wheel 20 is forced into frictional drive engagement with electrode 7 to propel the electrode 7 toward plate 2. An arc 10 is struck therebetween to form the third spot weld.

Contacts 60–3 are normally open contacts connected in series with the timing coil 61 and prevent energizing of coil 61 until the end of the timing cycle for coil 60. When coil 60 times out, contacts 60–3 close and energize timing coil 61. Timing coil 61 actuates a set of contacts 61–1 after an adjustable energized period. Contacts 61–1 are connected in series with the parallel connected relay coil 58 and the timing coils 59, 60 and 61 forming the timer 9. When coil 61 times out, the circuit to timer 9 is opened and the timer 9 returns to standby with the contacts in the normal position shown in FIG. 6.

In summary, the welding head 3 is suitably positioned with the nozzle assembly 4 immediately overlying the workplates 1 and 2 in the area where a burn-through weld is to be established. The electrodes 5, 6 and 7 are suitably spaced within the openings in the nozzle 37 to provide the desired weld length.

The push button switch 57 is actuated and automatically establishes the necessary flow of shielding gas and cooling water to the nozzle assembly 4.

Relay coil 58 is energized to close the contacts 58–2 and drive motor 12 is energized to rotate the driven wheels 19.

Simultaneously timer 9 is energized to establish the sequential feed of electrodes 5, 6 and 7 toward plate 2 beginning with electrode 5.

Power is impressed on all of the electrodes 5, 6 and 7 from the common source. An arc 10 is first struck between the electrode 5 and the plate 2 because of the action of timer 9 and an arc spot weld 11 is created adjacent electrode 5. Timing coil 59 is set to time out in accordance with the desired spot weld after which the arc 10 between the electrode 5 and the plate 2 is broken.

Simultaneously, with the breaking of arc 10 at electrode 5, the electrode 6 is fed toward plate 2 and the timing relay coil 60 is energized to start the timing period for electrode 6. An arc 10 is established between the electrode 6 and the plate 2 and a second arc spot weld 11 is thereby created immediately adjacent the first arc spot weld with the weld bead of each overlapping and blending into a single bead 11. At the end of the timing period of timing coil 60, the feeding of the electrode 6 ceases and the arc 10 is broken. The electrode 7 is then automatically fed to the plate 2 and timing relay coil 61 energized to start the timing period for electrode 7. An arc 10 is struck between electrode 7 and plate 2 and a third arc spot weld is thereby established which overlaps and blends into the second spot weld.

The effect of spacing of contact tubes 42 and thus the electrodes 5, 6 and 7 is shown in the following chart and in FIGS. 8, 9 and 10 of the drawings. The several welds shown in FIGS. 8, 9 and 10 were made on .103″ mild steel frame stock having sufficient overlaps to allow burn-through welding. Bare electrodes of 1/16″ diameter were used and carbon dioxide shielding gas was fed to the arc at the rate of 30 cubic feet per hour. A copper chill was provided beneath the weld area and a 600 ampere constant potential power source supplied the current to the electrode.

| Weld | Electrode Spacing Center to Center, inch | Welding Current Amperes | Welding Voltage | Welding Time in Seconds | | |
|---|---|---|---|---|---|---|
| | | | | #1 | #2 | #3 |
| Fig. 8 | 1 | 400 | 34 | 41 | 38 | 38 |
| Fig. 9 | 5/8 | 400 | 34 | 40 | 30 | 30 |
| Fig. 10 | 9/32 | 400 | 34 | 49 | 40 | 27 |

A 1 inch center to center spacing of the electrodes 5, 6 and 7 resulted in three spaced spot welds, as shown in FIG. 8. A ⅝ inch spacing resulted in a single outwardly appearing bead with reinforced ends but three individual internal buttons, as shown in FIG. 9. A %₃₂ inch spacing of the electrodes resulted in a single continuous weld, as shown in FIG. 10.

The elongated arc spot weld 11 is a high strength joint which is created without the necessity of complicated automatic machinery or highly skilled operators. Further, successive separate welds can be established with a high degree of uniformity between the several welds.

Figure 11:
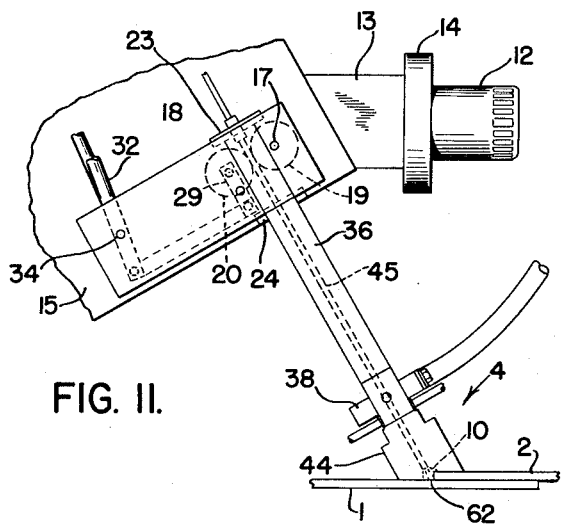
FIG. 11 is an enlarged fragmentary view of welding apparatus similar to FIG. 1 with the apparatus positioned and modified to establish an edge arc spot weld.

In FIG. 11, a similar embodiment of the invention is illustrated adapted for edge-type arc spot welding. Similar components in the previous embodiment and FIG. 7 are given corresponding numbers for purposes of simplicity and clarity of explanation. The second embodiment is fully described to the extent necessary to clearly and fully understand the structure and operation thereof.

The plates 1 and 2 are provided in overlapped relation and a weld is to be formed at the edge of the upper plate 1. The illustrated arc welding head 3 is identical to that shown in the previous embodiment with the exception that the mounting plate 15 has been rotated to dispose the axis of the electrodes 5, 6 and 7 at an angle which is approximately 30 degrees from the vertical.

The nozzle assembly 4 is generally similar to that shown in the previous embodiment with the lower end of the gas cup 44 tapered and offset as at 62 to maintain abutment with both plates 1 and 2. The gas cup 44 maintains essentially complete covering of the arc area except for the small recesses 55 formed in the lower end of the gas cup.

An edge-type weld practically necessitates angular location of the electrode to establish suitable overlapping arc spot welds. The illustrated angle of 30 provides optimum results. Further, to provide a high strength edge-type weld, a relatively tight fit between the plates 1 and 2 normally is required with present welding procedures.

The embodiment shown in FIG. 11 otherwise functions in precisely the same manner as the previously described and no further description thereof is given.

The elongated arc spot weld is strongest perpendicular to the normal stresses to which the weld is subjected and is therefore preferably so formed.

As the contact tube spacing decreases, the weld strength appears to decrease with other conditions remaining relatively constant. The increased strength with increased spacing is apparently due to the formation of the three separate interface buttons as shown in FIG. 9. A longer weld cycle time and lower current for each individual arc also produces a somewhat higher strength weld than a short time cycle with higher current.

The present invention thus provides an arc spot welding unit which is adapted to form relatively long weld beads. The invention may be applied to form separate or integrated spot welds in horizontal, vertical or overhead welding processes and the like. The apparatus of this invention is particularly adapted for commercial use because it removes completely the skill of the operator from the final results and sequentially energizes the several electrodes whereby a single power source of normal capacity can be employed.

Various modes of carrying out the invention are contemplated as being within the scope of the following claims particularly pointing out and distinctly claiming the subject matter which is regarded as the invention.

I claim:

1. The method of forming an elongated arc spot weld upon a workpiece, comprising sequentially establishing a series of separate arc spot welds having a common continuous exposed bead.

2. The method of forming an elongated arc spot weld upon a workpiece, comprising establishing a series of timed arcs to produce arc spot welds forming an elongated weld having a common continuous exposed bead, the separate arc spot welds being sequentially formed from one end to the other and with each arc being struck essentially coincident the termination of the immediately preceding arc.

3. The method of forming an elongated arc spot weld upon a workpiece, comprising establishing a series of separate arcs of individually predetermined periods to produce a plurality of adjacent spot welds defining a common continuous exposed bead, the separate arcs being sequentially established from one end to the other of final weld and with each arc being struck essentially coincident with the termination of the immediately preceding arc.

4. The method of edge welding of overlapping metal members with an arc spot welding unit having a series of separately and sequentially actuated consumable electrodes, comprising feeding said electrodes at an angle of substantially 30 degrees to the vertical plane.

5. The method of forming an elongated arc spot weld upon a workpiece, comprising sequentially feeding a series of spaced electrodes toward the workpiece, supplying current to the electrodes to establish an arc between the moving electrode and the workpiece, and selecting relatively long individual arc periods and relatively low individual arc currents.

6. The method of forming an elongated arc spot weld at the edge of a pair of overlapping workpieces disposed in a horizontal position, which comprises establishing a tight fit between the workpieces at the weld area, sequentially feeding consumable electrodes at substantially thirty degrees to the vertical, and striking arcs between the moving electrodes and the workpieces to form a series of arc spot welds at the weld area having a common outer bead.

7. In a multiple arc spot welder including an incoming power connection, a series of electrodes mounted in predetermined alignment and connected to the incoming power connection, drive means to separately and sequentially drive the electrodes, and timer means to sequentially actuate said drive means to establish a series of arc spot welds.

8. In a multiple arc spot welder, a series of electrodes mounted in predetermined alignment and adapted to be connected to a source of power, drive means to separately and sequentially drive the electrodes, a single power source connected to supply current to the electrodes, and timer means to sequentially actuate said drive means to establish a series of arc spot welds.

9. In a multiple arc spot welder adapted to form an elongated arc spot weld by striking arcs between a series of electrodes and the work, an electrode support including a plurality of electrode holding means arranged in alignment with the location of the spot weld area to properly locate the electrodes, drive means to separately drive the electrodes to the workpiece, and timer means to sequentially actuate said drive means to sequentially establish a series of overlapping arc spot welds forming said elongated arc spot welds.

10. In a multiple arc spot welder to form an elongated arc spot weld upon metal work, a series of electrodes mounted in alignment with the location of the spot weld area, drive means to separately drive the electrodes to the workpiece, a single power source connected to supply welding current to the electrodes, and timer means to sequentially actuate said drive means to transport the electrodes toward the metal work whereby adjacent arcs are successively struck to create a series of arc spot welds forming said elongated arc spot welds.

11. In a multiple arc spot welding unit adapted to form an elongated arc spot weld upon metal work, a nozzle having a series of spaced electrode contact tubes adapted to receive consumable electrodes, a single power source connected to said contact tubes, drive means for individually transporting the electrodes through the nozzle, and automatic timing means to actuate the drive means to sequentially transport the electrodes through the nozzle.

12. In a multiple arc spot welding unit adapted to form an elongated arc spot weld upon metal work, a nozzle having a series of spaced electrode contact tubes adapted to receive consumable electrodes, a single power source connected to said contact tubes to supply welding current to the electrodes for striking arcs, drive means for individually transporting the electrodes through the nozzle, a single gas cup secured to the nozzle to form a gas passage and projecting from the nozzle into engagement with the work to enclose the arcs, and automatic timing means to actuate the drive means to sequentially transport the electrodes through the nozzle and sequentially establish the arcs between the electrodes and the work.

13. In a multiple arc spot welding unit adapted to form an elongated arc spot weld upon a metal workpiece, a metal nozzle having a series of spaced electrode openings, contact tubes releasably secured within the openings and adapted to receive consumable electrodes, a single power source connected to said metal nozzle, said nozzle having water cooling passages to cool the nozzle during welding, drive means including simultaneously actuated driven means for each electrode and cooperative electrode coupling means adapted to operatively couple the electrodes to the associated driven means for individually transporting the electrodes through the nozzle, and automatic timing means connected to the coupling means to sequentially transport the electrodes through the nozzle.

References Cited in the file of this patent

UNITED STATES PATENTS

| | | |
|---|---|---|
| 1,340,056 | Kenyon | May 11, 1920 |
| 2,436,387 | Harter | Feb. 24, 1948 |
| 2,654,015 | Landis et al. | Sept. 29, 1955 |
| 2,658,162 | Tichenor et al. | Nov. 3, 1953 |
| 2,814,719 | Wilson | Nov. 26, 1957 |
| 2,868,956 | Labosco | Jan. 13, 1959 |
| 2,965,745 | Hardy et al. | Dec. 26, 1960 |